W. I. TWOMBLY.
CONVERTIBLE VEHICLE BODY.
APPLICATION FILED FEB. 10, 1911.

1,157,266.

Patented Oct. 19, 1915.
4 SHEETS—SHEET 1.

WITNESSES:

INVENTOR
Willard Irving Twombly,
BY
John O. Seifert
ATTORNEY

W. I. TWOMBLY.
CONVERTIBLE VEHICLE BODY.
APPLICATION FILED FEB. 10, 1911.

1,157,266.

Patented Oct. 19, 1915.
4 SHEETS—SHEET 3.

WITNESSES:
Howard C. Thompson
P. Philipp

INVENTOR
Willard Irving Twombly,
BY John Q. Seifert
ATTORNEY

W. I. TWOMBLY.
CONVERTIBLE VEHICLE BODY.
APPLICATION FILED FEB. 10, 1911.
1,157,266.
Patented Oct. 19, 1915.
4 SHEETS—SHEET 4.
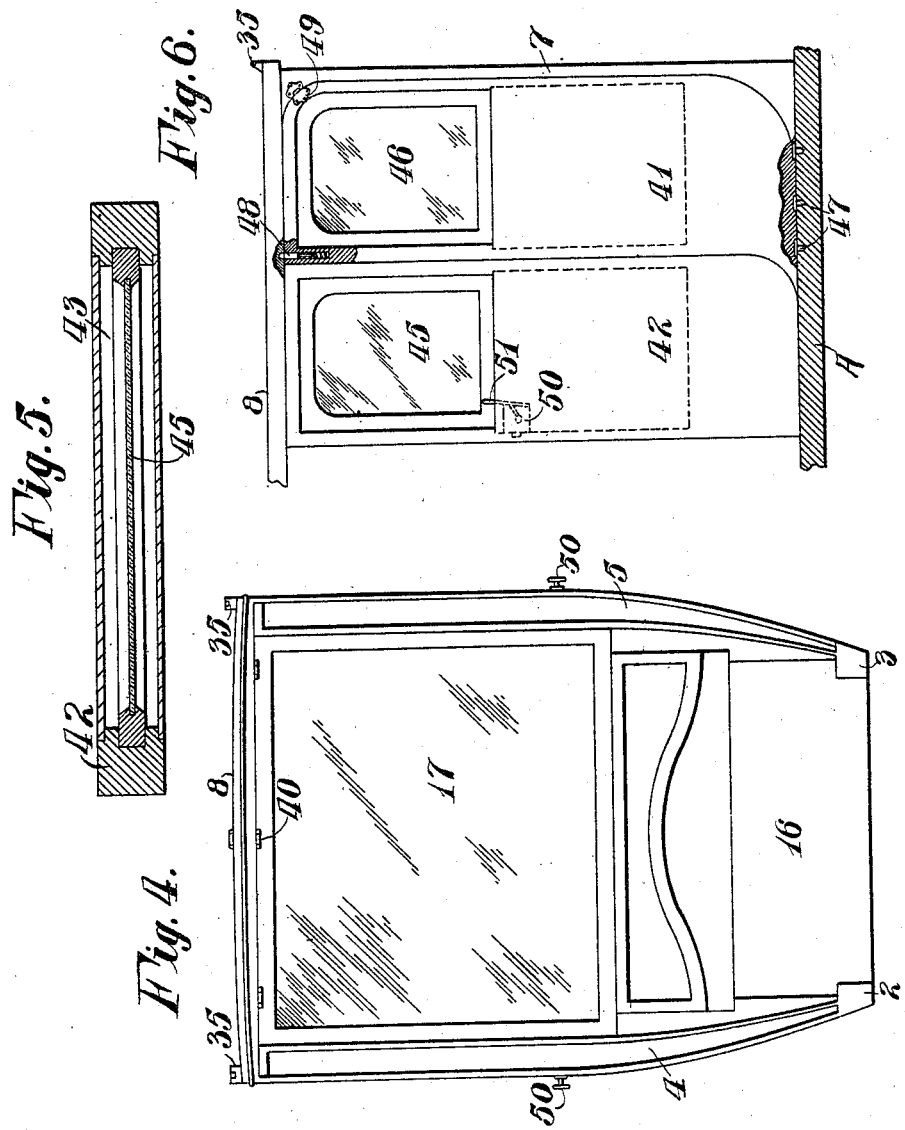
WITNESSES:
INVENTOR
Willard Irving Twombly,
BY
ATTORNEY

UNITED STATES PATENT OFFICE.

WILLARD IRVING TWOMBLY, OF NEW YORK, N. Y., ASSIGNOR TO TWOMBLY MOTORS COMPANY, OF NEW YORK, N. Y., A CORPORATION OF NEW YORK.

CONVERTIBLE VEHICLE-BODY.

1,157,266.     Specification of Letters Patent.     Patented Oct. 19, 1915.

Original application filed March 4, 1910, Serial No. 547,207. Divided and this application filed February 10, 1911. Serial No. 607,737.

*To all whom it may concern:*

Be it known that I, WILLARD IRVING TWOMBLY, a citizen of the United States, residing in the borough of Manhattan, in the city, county, and State of New York, have invented new and useful Improvements in Convertible Vehicle-Bodies, of which the following is a specification.

This invention relates to vehicle bodies, and it is the object of the invention to provide a combination convertible vehicle body which may be readily converted from an entirely closed to a partly or entirely open body, and as readily re-converted into an entirely closed structure.

It is a further object of the invention to provide a vehicle body comprising two compartments, the front one for the driver and the other for passengers, either one or both of which may be converted from an entirely closed to a partly or entirely open compartment, and vice versa.

The present application is a division of my application filed March 4, 1910, Serial No. 547,207, and relates particularly to the novel construction and arrangement of the front compartment, whereby the sides thereof may be readily and quickly removed to convert it from an entirely closed to a compartment having open sides, the sides comprising a panel and a door hinged thereto, said panels and doors constructed with window receiving pockets and having drop windows which may be dropped into the pockets to convert said compartment to a partly open sided one.

Figure 1:
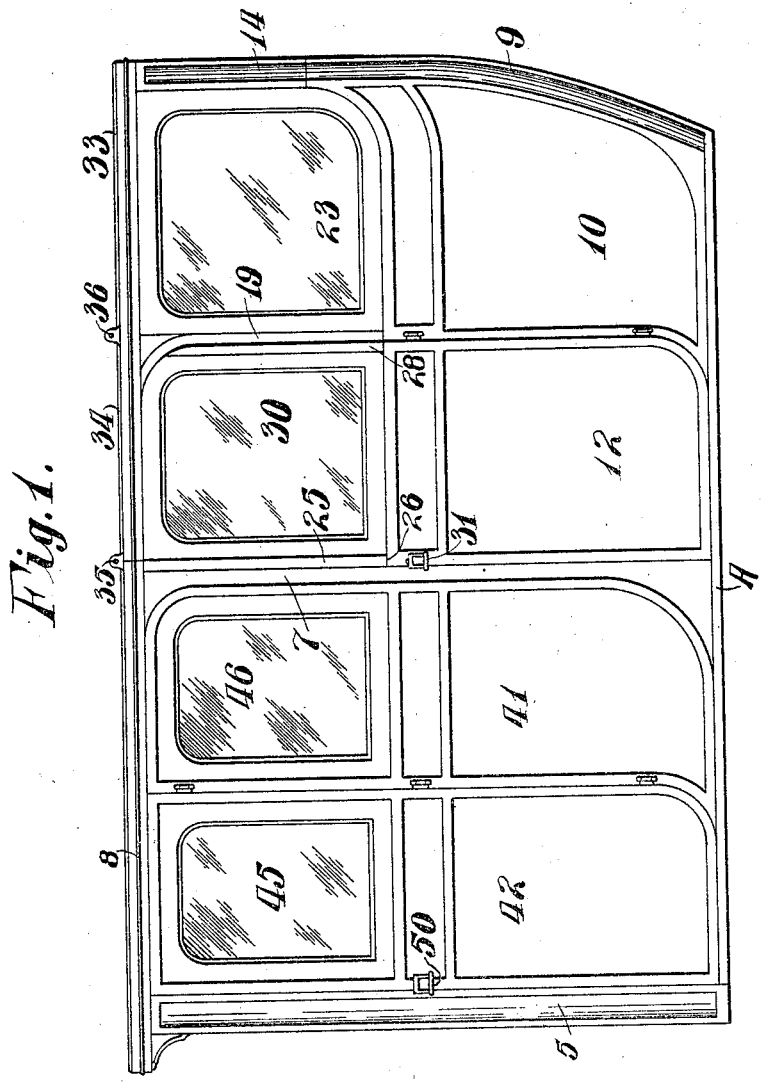
Figure 2:
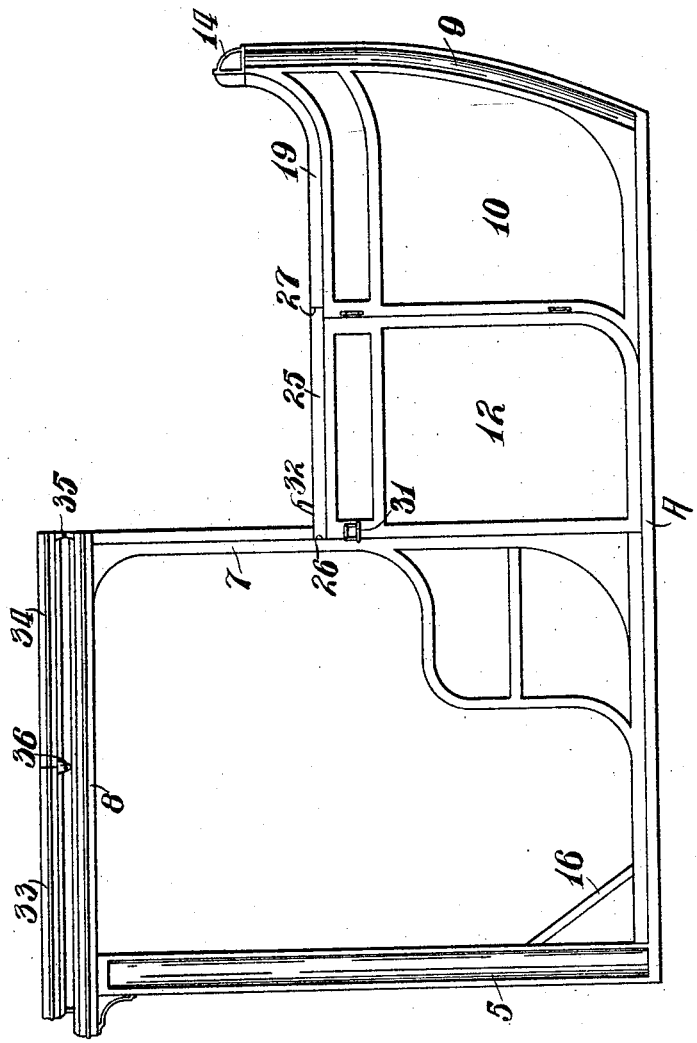
Figure 3:
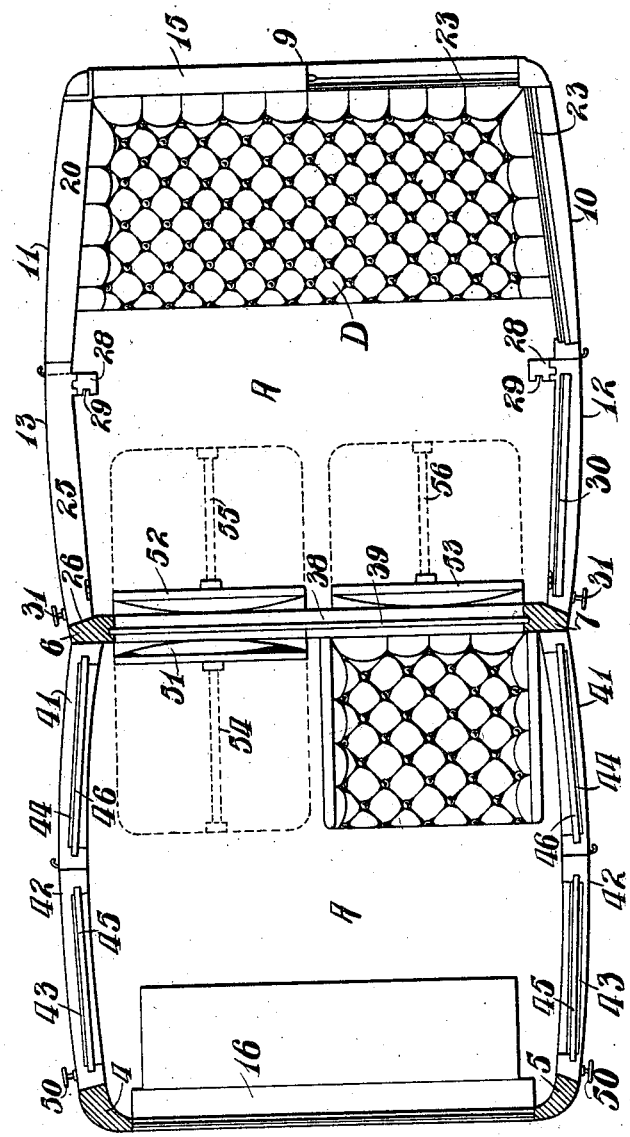

In the drawings accompanying and forming a part of this specification, Figure 1 is a side elevation illustrating the body as a closed and integral one. Fig. 2 is a side elevation, the side panels having been removed from the front compartment to convert it into an open structure, and the roof of the rear compartment as folded over the top of the front compartment, roof-supporting pillars at the sides and back folded into the body, and door-window supporting-frame as folded into the door, to convert said compartment, and the entire body, into an entirely open structure. Fig. 3 is a sectional plan view, the roof of the front compartment being removed to illustrate the manner of dropping the windows into the panels and doors in said compartment; one side of the rear compartment illustrating the manner of dropping the windows into the pockets in the body and door, and the other side illustrating the manner of the pillars folding into the body. Fig. 4 is a front elevation, the parts being in the positions illustrated in Fig. 1. Fig. 5 is a sectional view to illustrate the construction of the window receiving pockets and the manner of sliding the windows therein; and Fig. 6 is a detail showing the manner of fastening the panels in the front compartment, and showing in dotted lines the positions the windows assume when dropped into the pockets.

Similar characters of reference designate like parts throughout the different views of the drawings.

In the drawings I have illustrated one form of my invention, and as comprising a vehicle body having two compartments, the floor (designated in a general way by A) of which is common to both, a pair of sills 2 and 3 constituting a part of said floor whereby to secure the body to the chassis frame of the vehicle.

Constructed integral with the floor and forming a part of the front compartment are rigid roof-supporting pillars 4, 5, 6, and 7, a rigid roof 8 being secured to said pillars and extending over the front compartment to form the roof thereof.

The rear compartment comprises an integral back 9 and sides 10, 11, doors 12, 13 being hinged to said sides and when closed forming a continuation thereof. At the back of the body are foldable roof-supporting pillars 14, 15 secured thereto by suitable hinges.

At the sides are hinged foldable roof-supporting pillars 19, 20. The said pillars 14, 15, 19, 20 constitute window-supporting frames, and for this purpose are provided with grooves in which windows 23 are carried to have sliding movement. The sides and back are constructed with pockets into which the windows may be dropped when converting the vehicle body to an open structure.

The doors 12, 13 have a foldable window-carrying frame, comprising an upright 25 which has a sliding joint connection with the door, and adapted to be folded down over the top thereof, the lower end 26 when folded down being flush with the edge of the door, and the upper end 27 breaking joints with the bottom of the rails 19, 20. The other upright 28 is hinged to the door, and adapted to fold inside thereof, as clearly shown in Fig. 3. The said uprights 25, 28 have slideways 29 for supporting a removable or drop window 30 and the doors are provided with pockets similar to the pockets in the back and sides, into which the windows may be dropped. The doors have a locking bolt of usual construction provided with a handle 31 for opening it from the outside, and a hand-piece 32 to permit opening from the inside.

The roof over the rear compartment comprises a plurality of hinged sections 33, 34, the section 34 being secured to the rigid roof 8 by hinges 35, and the section 33 secured to the section 34 by hinges 36. In normal position the hinged sections rest upon the foldable pillars 14, 15, 19 and 20, and positioned by means of dowels, although any other suitable means may be used for this purpose. The roof sections 33, 34, also have window-receiving grooves in which the upper ends of the windows engage when the body is in normal closed position. The said compartment is also provided with the usual upholstered seat, designated in a general way by D.

The partition between the front and rear compartments comprises a rigid lower portion 38 having a pocket therein similar to the pockets in the body proper. In the upper portion of said partition is a removable or drop window or panel 39 which may be dropped into said pocket. I have shown this partition as being of a convertible structure, but it will be obvious that the same may be constructed integral.

The lower portion of the front compartment comprises a dash-board 16, and the upper portion an adjustable window 17, said window secured in any suitable manner, as by hinges 40, so that it may be folded and locked up against the inside of the roof 8. The sides of said compartment comprise removable panels 41, with doors 42 hinged thereto; said doors and panels have pockets 43, 44 in the lower portions and are provided with removable or drop windows 45, 46, which may be dropped into the pockets 43, 44. The pockets 43, 44 in the panels and doors are of the usual construction, a panel secured to the outside of the framework constituting the outer wall and a panel secured to the inside forming the inner wall. To releasably secure the sides 41 in place they are provided with dowels 47 at the bottom to engage in sockets in the floor A; at the top a releasable spring actuated bolt 48 engages in the rigid roof 8, and a cam latch 49 having an eccentric bolt to draw the side securely in place. The doors have the usual spring lock 50 with a handle to open it from the outside, and a hand-piece 51 for opening it from the inside.

In Fig. 1 I have illustrated in side elevation the body as it will appear as an entirely closed structure. Should it be desired to convert the front compartment into an open structure, it is only necessary to release the bolts 48, 49 and lift the side, the dowels 47 pulling out of the sockets in the floor when the sides may be readily removed. However, should it be desired to convert said compartment into a partly open structure, the windows 45, 46 are dropped into the pockets in the doors and the sides. It will be obvious that the sides may be as readily put in place.

In Fig. 2 I have illustrated the body as having been converted into an entirely open structure. The sides with the doors in the front compartment are removed, the windows in the rear compartments dropped into the pockets in the sides and back of the body, and the door-windows dropped into the pockets in the doors; the foldable roof sections 33, 34 having been folded over the rigid roof 8 of the front compartment, and secured in any suitable manner.

It will be noted that the outer surface of the roof is of convex construction, and to permit of the foldable roof sections folding upon themselves and over the roof of the front compartment, it is essential that the axes of the hinges be in one plane. For this purpose the leaves of the outer hinges are constructed with a bevel surface to set flatly upon the roof, and the ears are made of different lengths to compensate for the difference in height between the outside edges and the middle of the roof.

The rear roof-supporting pillars 14, 15 are folded over the back of the body and locked in any suitable manner and the side roof-supporting pillars 19, 20 folded over the sides of the body, the tops breaking joints with the back of the body and the rear roof-supporting pillars. The uprights 28 of the doors are folded down inside of the doors, and the uprights 25 fold over the top of the lower door sections, the sliding-joint connection permitting the sliding of said uprights so that the bottom thereof will be flush with the edge of the door, and the tops will break joints with the bottom of the roof-supporting pillars 19, 20, the said uprights 25, 28 and pillars 19, 20 and 14, 15 constituting in connection with the hinges for the rear pillars 14, 15 a continuous and finished rail for the top of the vehicle body proper when converted into an open structure.

It will be obvious that in re-converting either one or both of the compartments from an entirely open to a partly or entirely closed structure the operations are the reverse to those of converting the body from an entirely closed to a partly or entirely open structure, and a detailed description of said operations is, therefore, not deemed necessary. The compartments may also be provided with any suitable foldable or adjustable seats, and in the present instance comprise seat portions 51, 52 and 53 hinged to the lower portions 38 of the partition between the two compartments, and provided with telescoping supports 54, 55 and 56, one member of which has a pivoted connection with the bottom of the seat and the other member with the floor. I have illustrated these seats in Fig. 3 in full lines in their folded positions, and in dotted lines in open or normal positions.

While I have shown my improvement in connection with a vehicle comprising two compartments, the one compartment having a convertible top, it will be obvious that the same may be adapted for use in connection with a vehicle body having a single compartment with a rigid or canopy roof, or with a body of this character having two compartments, thus providing removable sides for both compartments.

Variations may be resorted to within the scope of the invention.

Having thus described my invention I claim:

1. In a vehicle body, the combination with the floor and a fixed roof, of removable sides for said body extending from the roof to the floor comprising a pair of hingedly connected sections, one section adapted to be removably secured in a fixed position and the other section serving as a door for the vehicle body.

2. The combination with a vehicle body having a fixed roof, of means to close the sides between the roof and floor, comprising a pair of pivotally connected sections, one section constituting a door; and means to releasably secure the said sections between the roof and floor, consisting of pins projecting from the lower edge of said section to engage in openings in the floor, and coöperating latch mechanism connected to the upper end of said section and the door to draw and lock said section in position.

3. In a vehicle body, the combination with the floor and a fixed roof, of removable sides for said body extending from the roof to the floor, each side consisting of hingedly connected sections; means to releasably secure the sides in position, comprising pins projecting from the lower edge of one section to engage in sockets in the floor, and coöperating latch mechanism connected to the top of said section and the roof, the other section serving as a door for the vehicle body; windows in the upper portion of said sections; and window receiving pockets in the lower portion of said sections into which the windows are adapted to be dropped, substantially as and for the purpose specified.

4. The combination with a vehicle body having a fixed roof, of removable means to close the space between the roof and floor comprising a pair of pivotally connected sections, one section adapted to be removably secured in a fixed position and the other section serving as a door, substantially as and for the purpose specified.

WILLARD IRVING TWOMBLY.

Witnesses:
 JOHN O. SEIFERT,
 PAULA PHILIPP.